US011584559B1

(12) United States Patent
Bigbee, Jr. et al.

(10) Patent No.: US 11,584,559 B1
(45) Date of Patent: Feb. 21, 2023

(54) METHOD AND APPARATUS FOR APPLYING A LABEL TO A SPOOL OR REEL

(71) Applicant: Encore Wire Corporation, McKinney, TX (US)

(72) Inventors: William T. Bigbee, Jr., Melissa, TX (US); Clifton S. Thompson, Lucas, TX (US)

(73) Assignee: Encore Wire Corporation, McKinney, TX (US)

( * ) Notice: Subject to any disclaimer, the term of this patent is extended or adjusted under 35 U.S.C. 154(b) by 0 days.

(21) Appl. No.: 17/698,931

(22) Filed: Mar. 18, 2022

Related U.S. Application Data

(63) Continuation of application No. 17/093,247, filed on Nov. 9, 2020, now Pat. No. 11,286,077, which is a continuation of application No. 16/680,038, filed on Nov. 11, 2019, now Pat. No. 10,850,885, which is a continuation of application No. 15/441,954, filed on Feb. 24, 2017, now Pat. No. 10,494,130.

(60) Provisional application No. 62/300,515, filed on Feb. 26, 2016.

(51) Int. Cl.
*B32B 41/00* (2006.01)
*B65C 1/02* (2006.01)

(52) U.S. Cl.
CPC .................................... *B65C 1/02* (2013.01)

(58) Field of Classification Search
CPC ................................ B65C 1/02; B32B 41/00
USPC .................... 156/60, 64, 350, 351, 378, 379
See application file for complete search history.

(56) References Cited

U.S. PATENT DOCUMENTS

| | | | |
|---|---|---|---|
| 2,961,717 | A | 11/1960 | Morin |
| 2006/0277269 | A1 | 12/2006 | Dent et al. |
| 2016/0052659 | A1 | 2/2016 | Bowers et al. |

*Primary Examiner* — Michael N Orlando
*Assistant Examiner* — Joshel Rivera
(74) *Attorney, Agent, or Firm* — Warren Rhoades LLP

(57) ABSTRACT

An apparatus for applying a label to a spool or reel containing wire and a wire tail extending from the spool or reel, the apparatus comprising a wire tail sensor, wherein the wire tail sensor identifies the location of the wire tail protruding from the spool or reel and a label application mechanism, wherein the labeling mechanism applies a label to the spool or reel and wherein the label does not contact the wire tail protruding from the spool or reel.

20 Claims, 18 Drawing Sheets

FIG. 3A
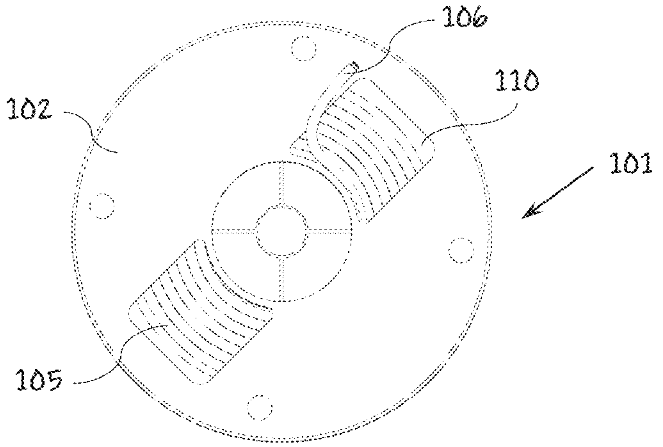
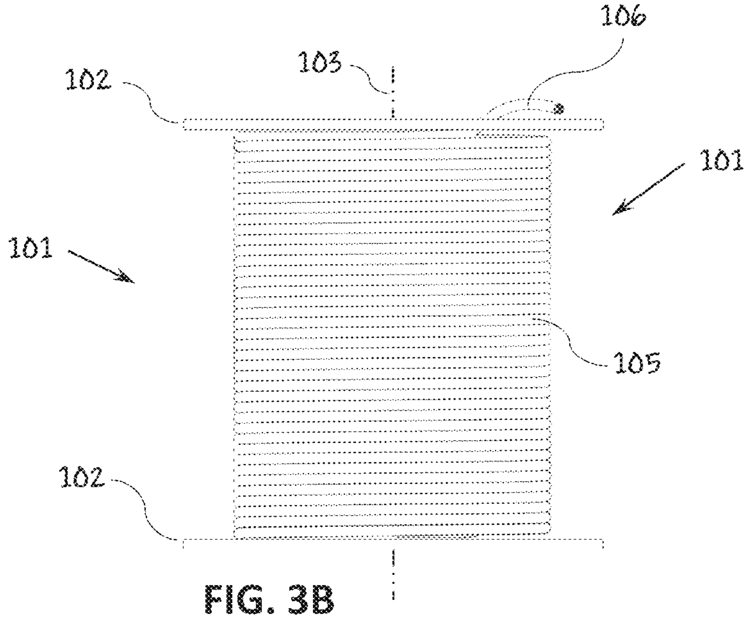
FIG. 3B

METHOD AND APPARATUS FOR APPLYING A LABEL TO A SPOOL OR REEL

CROSS-REFERENCE TO RELATED APPLICATIONS

This application is a continuation of U.S. patent application Ser. No. 17/093,247, filed Nov. 9, 2020, which is a continuation of U.S. patent application Ser. No. 16/680,038, filed Nov. 11, 2019, now issued as U.S. Pat. No. 10,850,885, issued Dec. 1, 2020, which is a continuation of U.S. patent application Ser. No. 15/441,954, filed Feb. 24, 2017, which issued as U.S. Pat. No. 10,494,130, on Dec. 3, 2019, which claims priority benefit to U.S. Provisional Patent Application No. 62/300,515, filed Feb. 26, 2016 all of which are fully incorporated by reference herein.

STATEMENT REGARDING FEDERALLY SPONSORED RESEARCH OR DEVELOPMENT

Not applicable.

REFERENCE TO A COMPACT DISK APPENDIX

Not applicable.

BACKGROUND OF THE INVENTION

1. Field of the Invention

The present invention relates in general to electrical wire and cable, and more particularly, to electrical wire and cable packaging.

2. Description of Related Art

The process of winding circuit-sized electrical wire or cables onto a spool or reel ("spooling") starts with a short length of the wire or cable protruding from a hole or cutout in one side of the spool or reel, near the central drum. This protruding length of wire, known in the industry as the "tail," remains in place after the spooling process is complete. The size of the tail may vary, but is typically several inches in length.

Typically, after the spooling process is complete, an adhesive-backed label is applied to the spool or reel. This label identifies and describes the product contained on the spool and gives additional information such as manufacturing date, UL listings, National Electrical Code (N.E.C.) ratings, etc. Manual application of such a label requires an extra worker and is excessively time consuming. Automatic mechanical label applicators may be used to apply the label, however, the applicators do not orient or index the spool or identify the location of the wire "tail" before the application of the label. As a result, the label is frequently applied directly onto or overlapping the wire tail. When the label is applied over, or is in contact with, the tail, the label fails make good contact with the spool surface and may not adhere properly. Consequently, the label may become detached from the spool during handling and/or during packaging and shipping.

Label detachment events may cause multiple problems. First, an unlabeled product affects sales and delivery and may require that the spool be re-labeled manually, a labor-intensive and costly process. Secondly, a detached adhesive label may adhere to or foul machinery in the manufacturer's facility, such as the labeling apparatus itself, conveyor systems, or other product-handling machinery downstream. Finally, a detached label could inadvertently adhere to another spool, which may hold a completely different wire or cable product. A mislabeled spool of electrical wire or cable poses not only a quality-control problem, but also a potential safety hazard upon installation.

Some methods for spooling and labeling circuit-sized electrical wire involves the coiling of wire or cable with a spooling machine. As the loaded spool leaves the spooling machine, the spool is oriented such that it lies flat on one side of the spool with the central axis of the spool oriented vertically. In this known method, the spool is then transported to a labeling machine.

Typical labeling machines dispense preprinted labels from a roll, using a presser foot, roller, or other mechanism to press a label directly onto the upward-facing side of the spool. Depending upon the specific installation, a labeling machine may cause the movement of the spool to slow down or stop briefly during labeling, or it may apply the label as the spool passes through the labeling machine, without causing the spool to slow down or stop.

In such typical labeling systems, the only orientation or indexing of the spool prior to labeling is laying the spool flat on one side so the other side can receive the label. The label is applied to whatever portion of the upward-facing side happens to be located directly beneath the label applicator. In this known method, the label may be applied without coming into contact with the wire tail, or it may be applied directly onto or overlapping the protruding wire tail.

Therefore, a need exists for a labeling system or apparatus capable of detecting and avoiding the wire tail of a wire or cable spool prior to labeling, so that the adhesive label is applied to the spool in a location clear of, or not in contact with, the wire tail.

SUMMARY OF THE INVENTION

According to one embodiment, an apparatus and method for applying an adhesive label to a spool of wire or cable, in such a way that the label is not applied onto or over the wire tail protruding therefrom, are disclosed. One embodiment includes an apparatus which (a) captures and grips the spool within the labeling machine; (b) indexes the position of the spool until the wire tail is detected; and (c) applies an adhesive label in a location such that the label does not come into contact with the wire tail. The gripping device is then released, and the spool exits the apparatus.

First, the wire is coiled onto a spool in a spooling machine that is known in the prior art. A mechanical lifting device lifts and turns the loaded spool, transferring it from the spooling machine onto an intake conveyor system for the labeling apparatus. During transfer, the spool is oriented so that (a) its central axis is vertical; (b) the flanges at both ends of the spool are oriented horizontally; and (c) the spool rests flat upon one flange with the wire tail protruding upward from a second flange. As the spool travels along the intake conveyor system, guide rails or pusher arms may be used to align the spool for transfer into the labeling apparatus itself.

According to one embodiment, the labeling apparatus includes a conveyor system, a spool gripping device, a label dispenser and applicator, various sensors, and a digital control system. The various sensors provide data to the control system, which in turn controls the various components of the labeling apparatus. The control system may also be used to configure the labeling apparatus to accommodate spools of varying sizes.

According to one embodiment, the spool-gripping device includes several vertically oriented rollers. One drive roller may powered by a motor, while the other rollers are idler rollers. The position of the drive roller may be fixed, whereas the idler rollers are attached to a sliding assembly. In one embodiment, a wire tail detection device is attached to the sliding assembly, situated between and above the idler rollers opposite the drive roller. The entire sliding assembly may actuated by a pneumatic pusher arm.

According to one embodiment, the spool is transported along the conveyor system until an optical sensor detects the presence of the spool. When the spool is detected, the conveyor system pauses, halting movement of that spool. The pusher arm pushes the sliding assembly toward the drive roller. As the sliding assembly reaches the spool, the idler rollers engage the spool and press it against the drive roller, thus securing the spool between the drive roller and idler rollers.

Next, the drive roller begins to rotate, which in turn rotates the spool about its central axis in the opposite direction. This rotation continues until the tail detection device locates the wire tail. When the wire tail is located, the drive roller stops the rotation of the spool and holds it in the now-indexed position. The label application device then applies the label onto the spool at a desired location relative to the location of the wire tail. Typically, the label is applied at a location diametrically opposite the wire tail, although the apparatus may be reprogrammed or reconfigured to allow for a label location at any desired position relative to the wire tail.

When the label is applied to the spool, the label application device disengages from the spool. The sliding assembly retracts away from the spool and drive roller, causing the idler rollers to disengage from the spool. Once the spool is free to move, the conveyor system transports the spool downstream, away from the labeling machine. With the arrival of a new unlabeled spool from the spooling machine, the labeling cycle begins anew.

According to one embodiment, the spool's wire tail is located and the spool is oriented before label application so that the label is applied in an ideal location. The label may be applied in a location such that it neither covers nor contacts the wire tail extending from the spool, allowing for very consistent label placement, resulting in the reduction or elimination of label detachment events, as well as a uniform product appearance.

BRIEF DESCRIPTION OF THE DRAWINGS

The foregoing summary, as well as the following detailed description, will be better understood when read in conjunction with the appended drawings. For the purpose of illustration, there is shown in the drawings certain embodiments of the present disclosure. It should be understood, however, that the invention is not limited to the precise arrangements and instrumentalities shown.

It should be noted that the terms "wire," "cable," "wire/cable," "wire or cable," and "conductor" may appear from time to time within the present disclosure. For purposes of the present disclosure, the use of "wire," "cable," or "conductor," whether separately or in combination, are intended to be used interchangeably unless otherwise specified. It should be further noted that in the context of the present disclosure, the terms "spool" and "reel," as applied to a flanged cylindrical device or apparatus upon which wire or cable is coiled for storage, packaging, and/or transport, may be used interchangeably unless otherwise specified.

It should also be noted that references are made herein to the spatial orientation of a spool or reel. For purposes of the present disclosure, horizontal or vertical orientation refers to the orientation of the flanges at either end of the spool. Thus, a spool or reel is said to be "vertical" or "upright" when it is oriented such that the flanges on either end of the spool or reel are oriented vertically, while its central axis is oriented horizontally. Conversely, a spool or reel is said to be "horizontal" or "flat" when it is oriented such that the flanges on ether end of the spool or reel are oriented horizontally, while its central axis is oriented vertically.

Figure 1A:
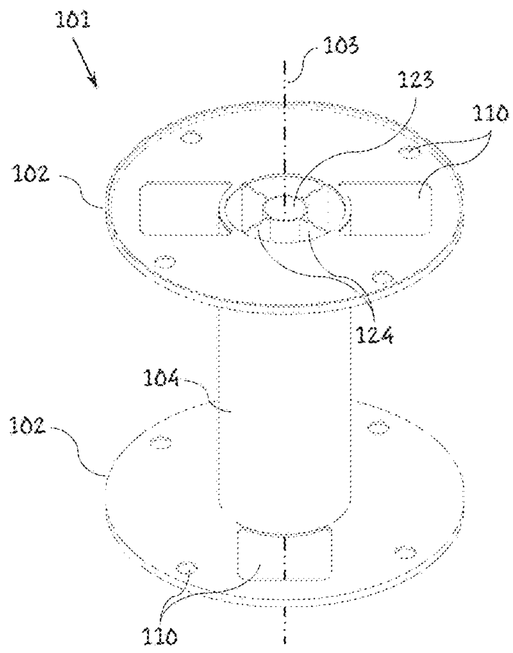
Figure 1B:
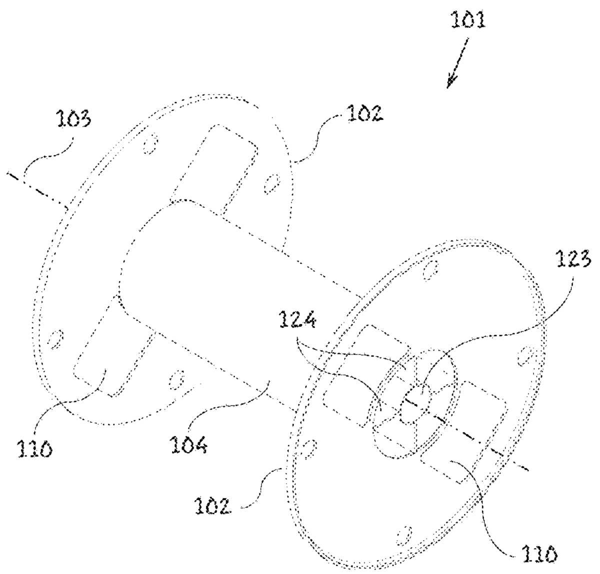
Figure 1C:
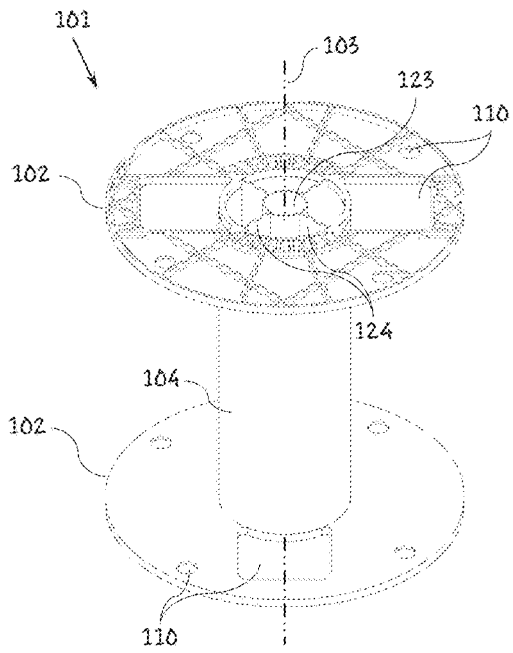
Figure 1D:
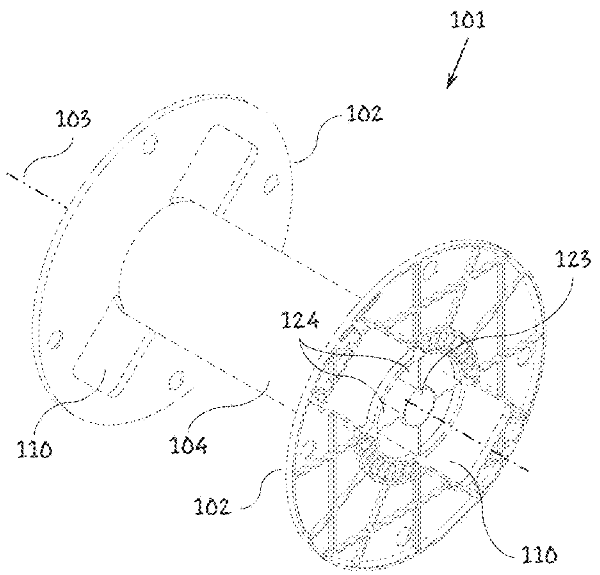
Figure 2A:
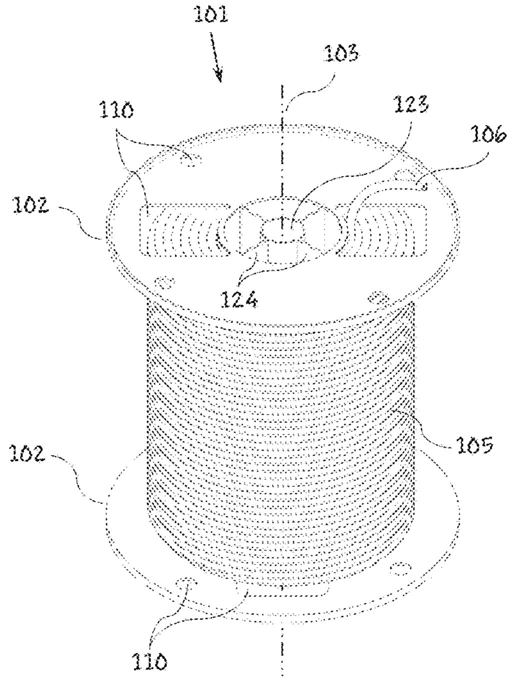
Figure 2B:
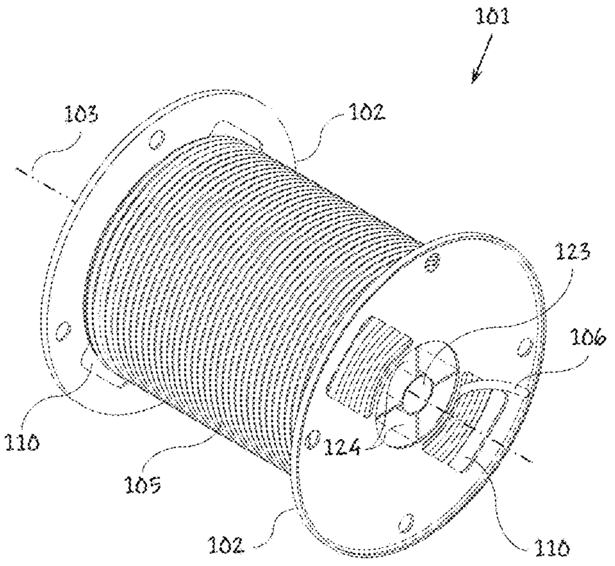
Figure 4:
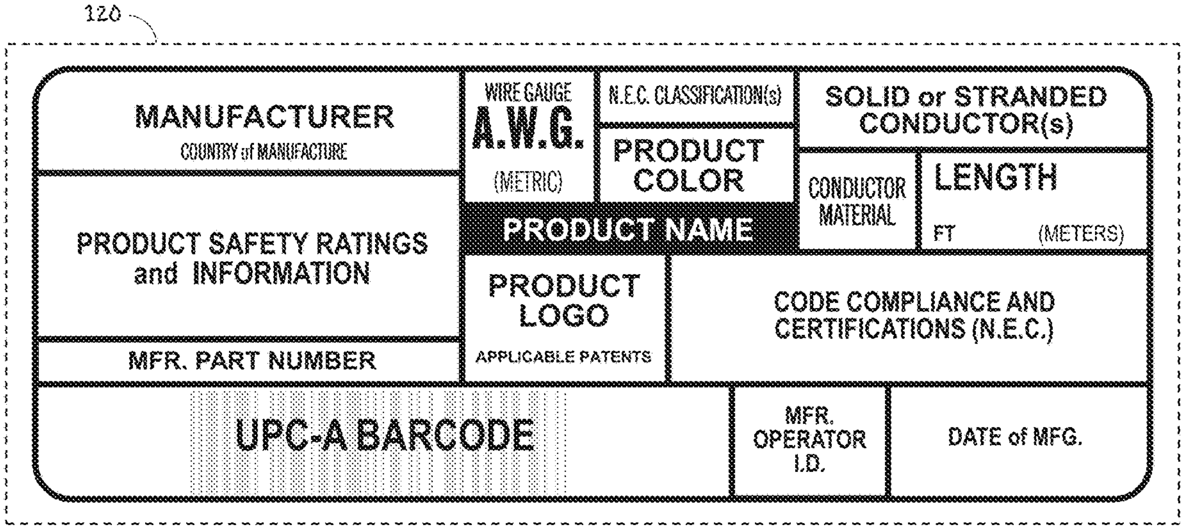
Figure 5A:
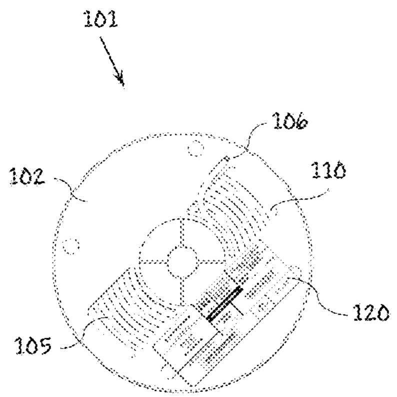
Figure 5B:
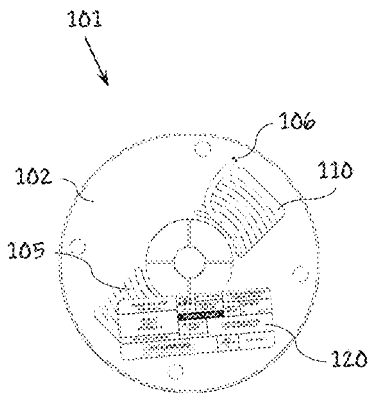
Figure 5C:
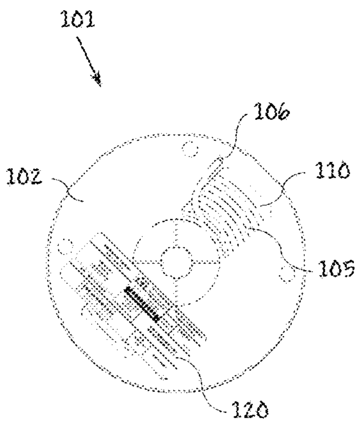
Figure 6:
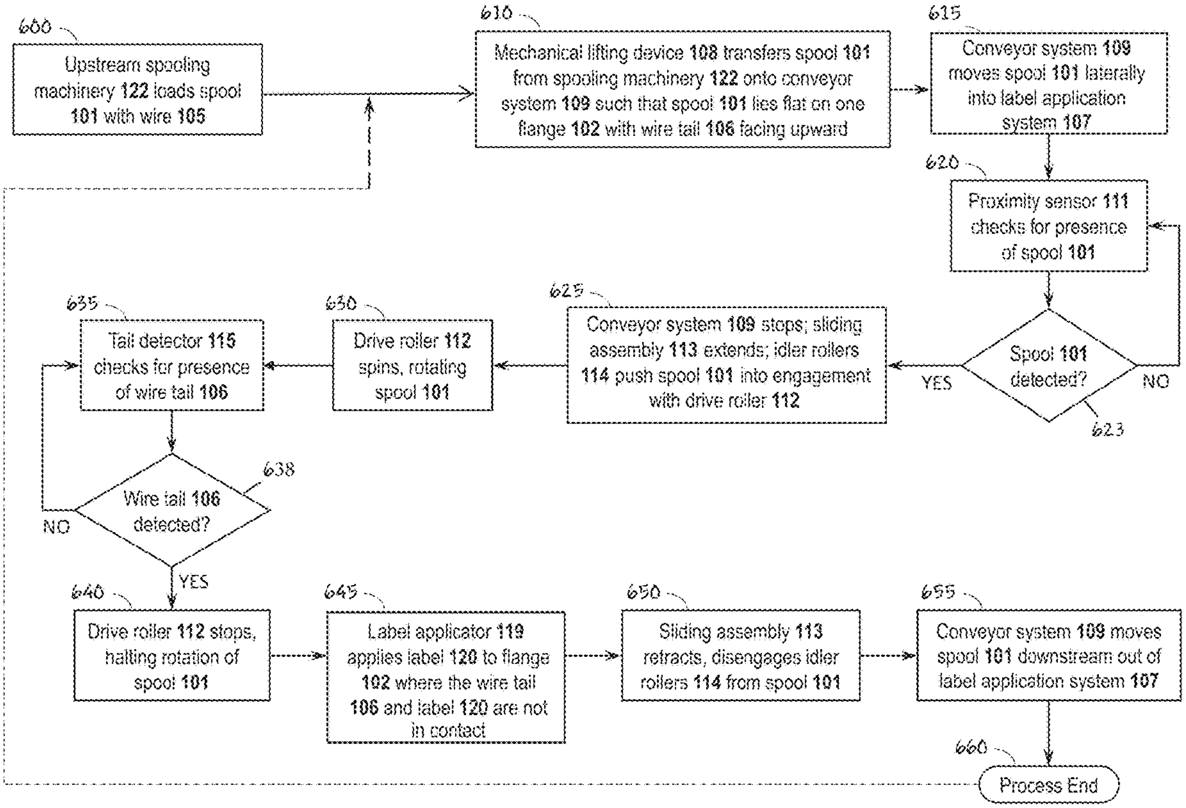
Figure 7:
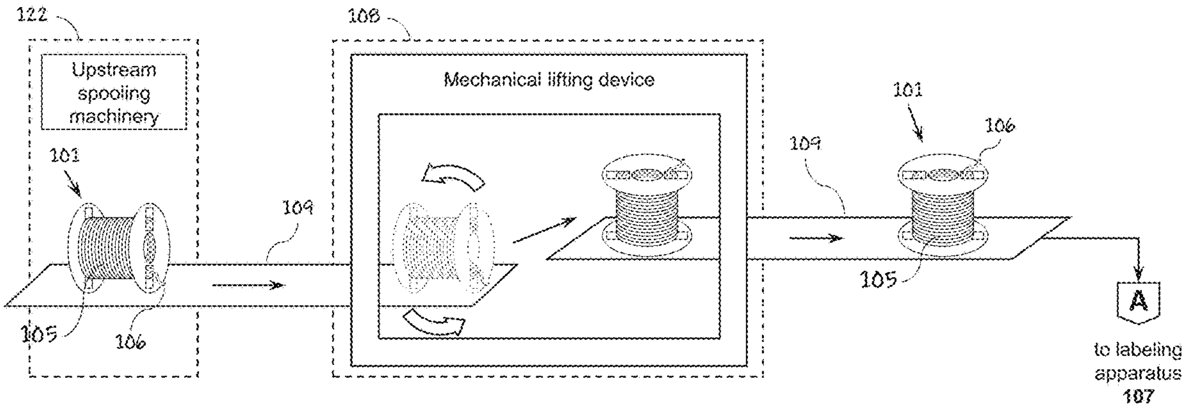
Figure 8A:
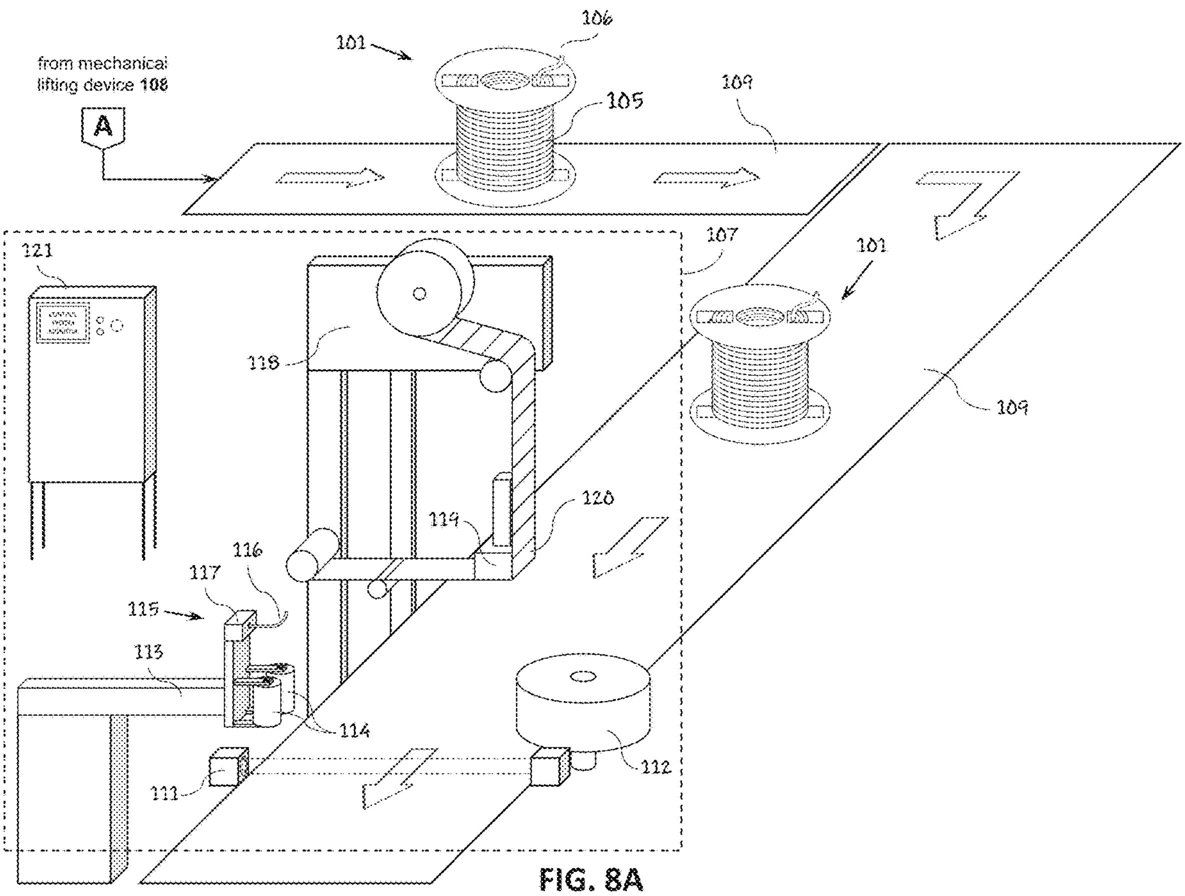
Figure 8B:
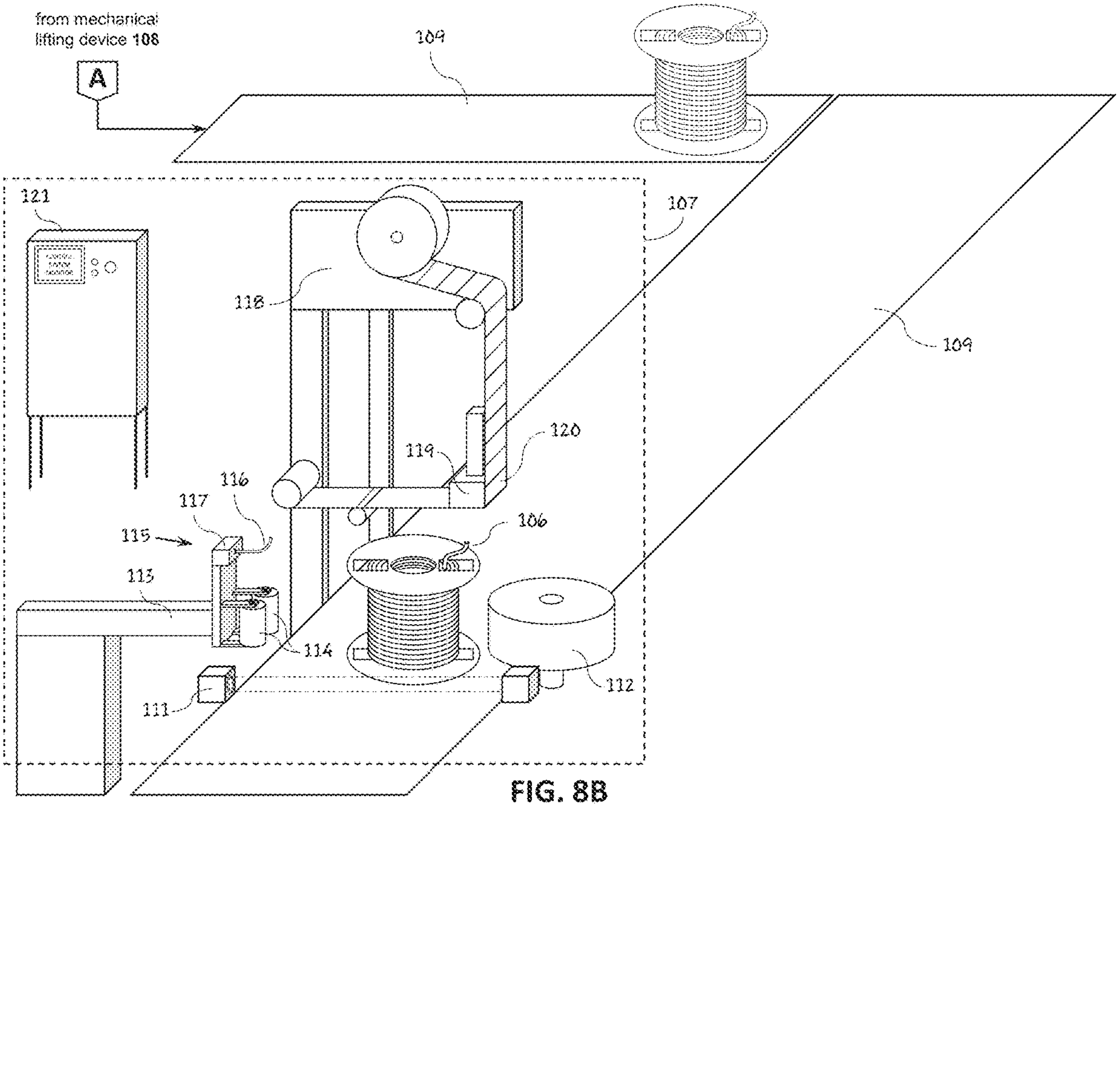
Figure 8C:
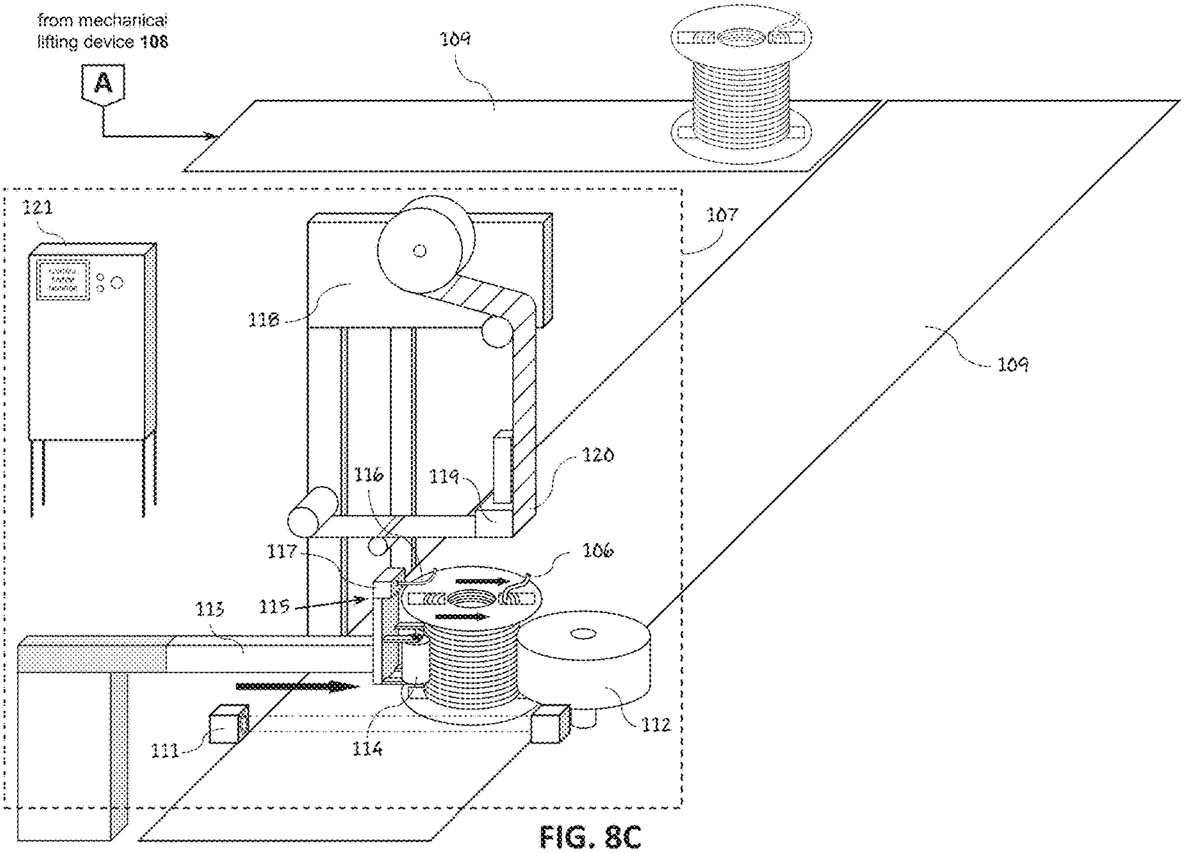
Figure 8D:
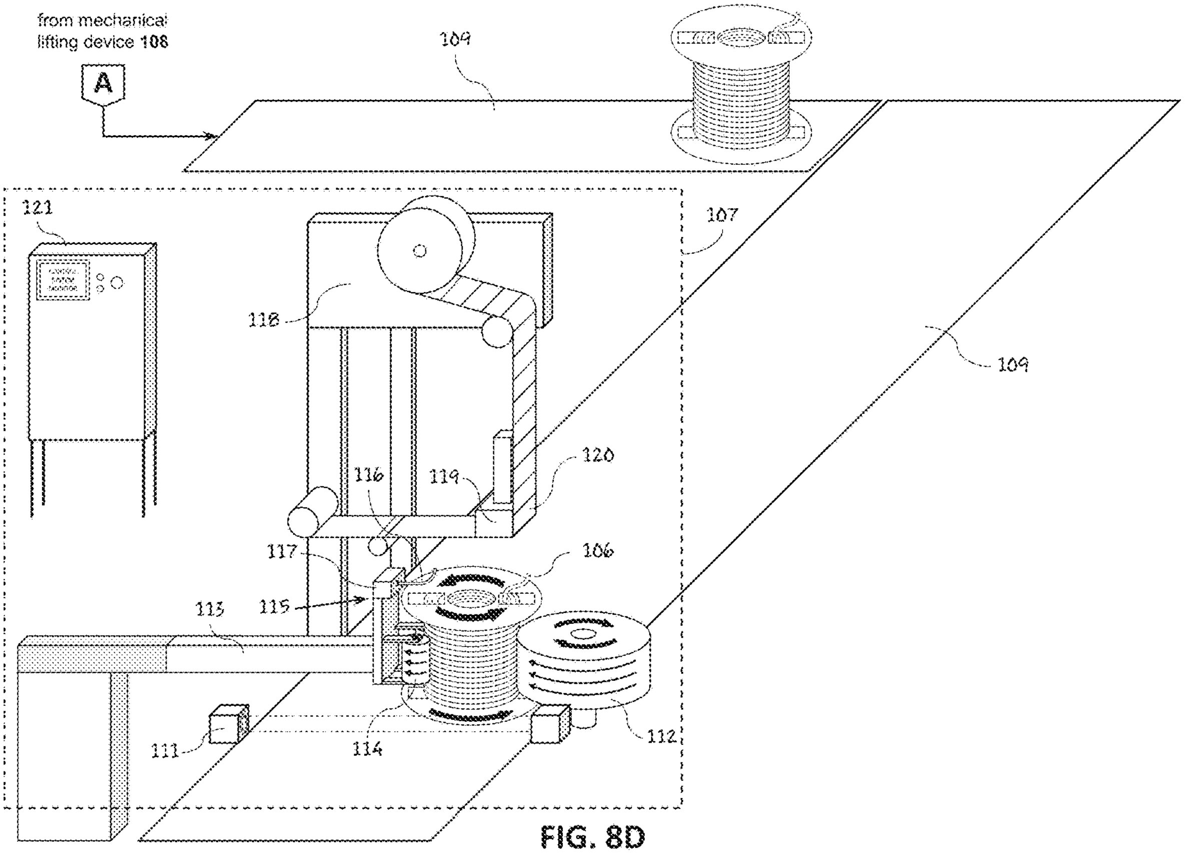
Figure 8E:
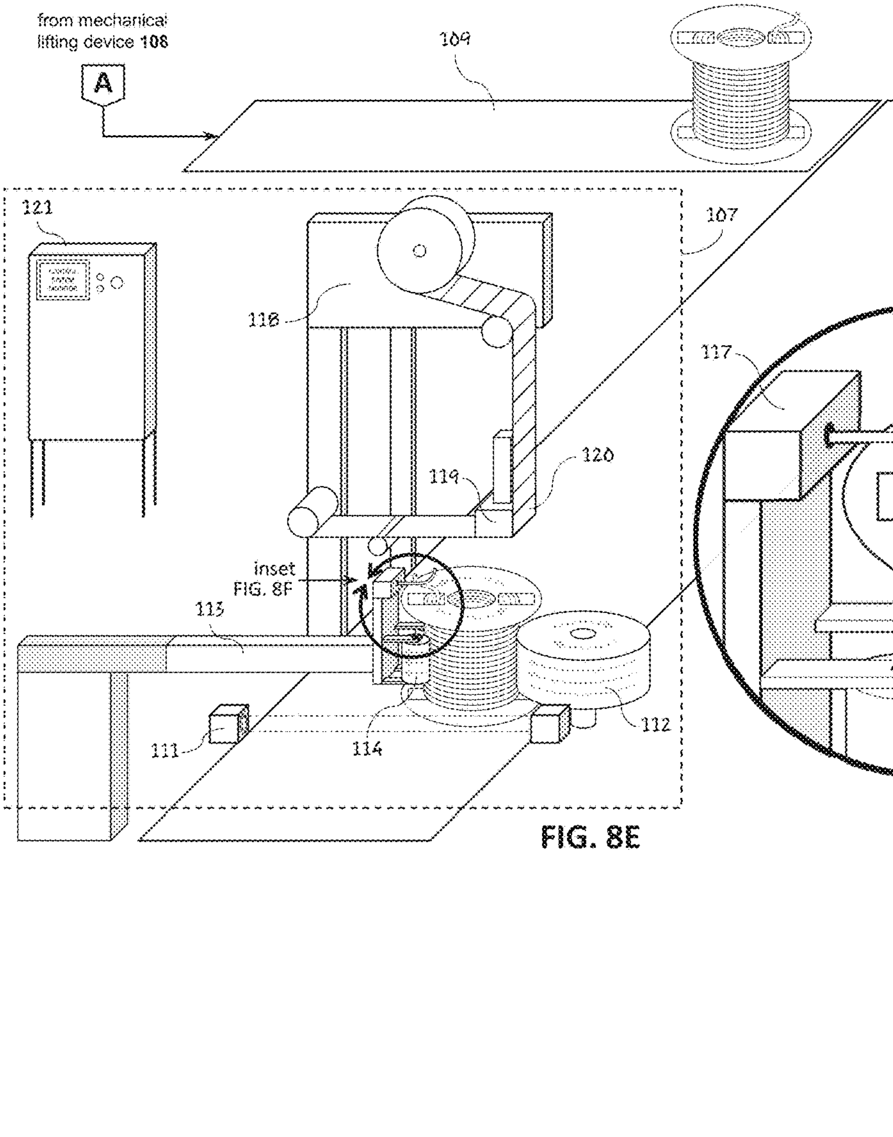
Figure 8F:
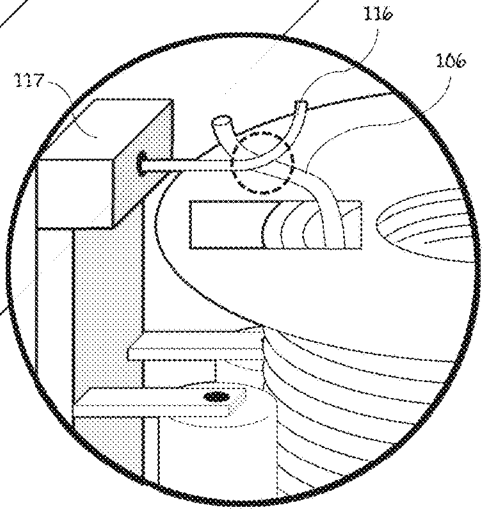
Figure 8G:
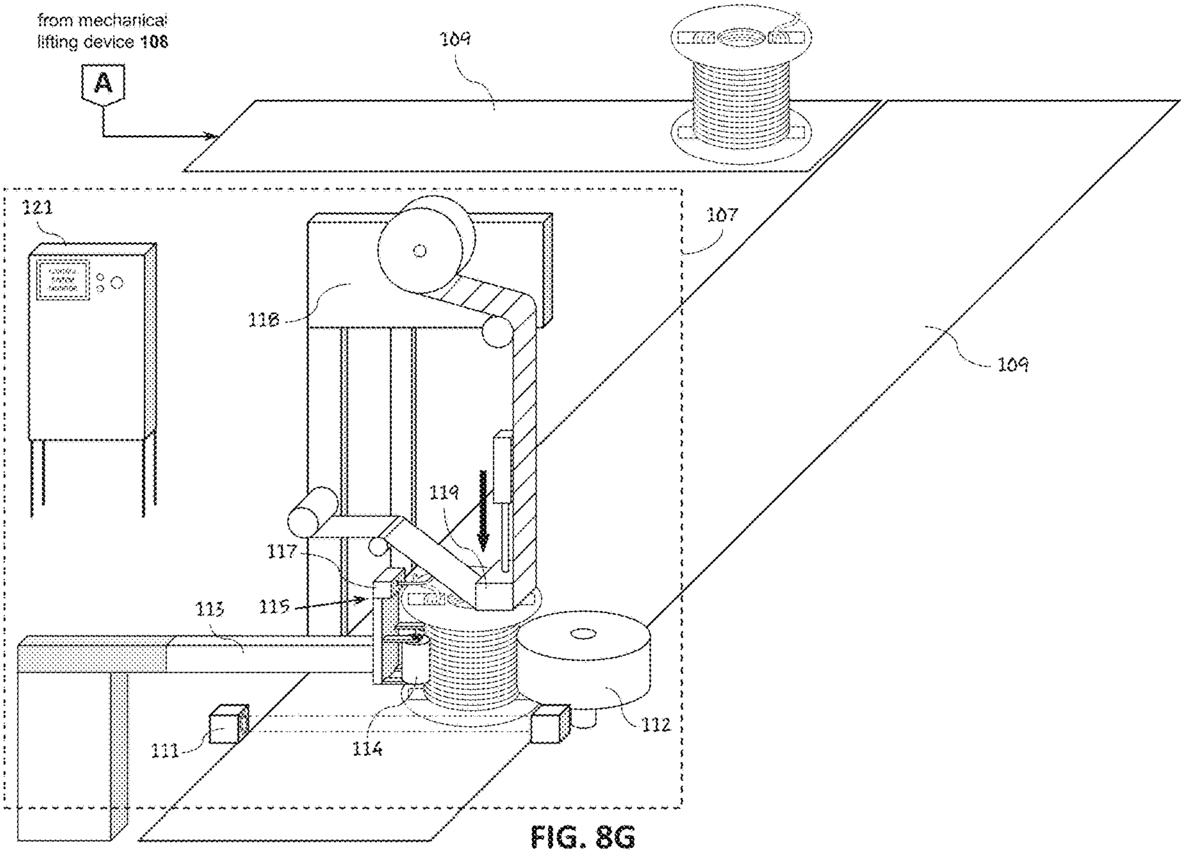
Figure 8H:
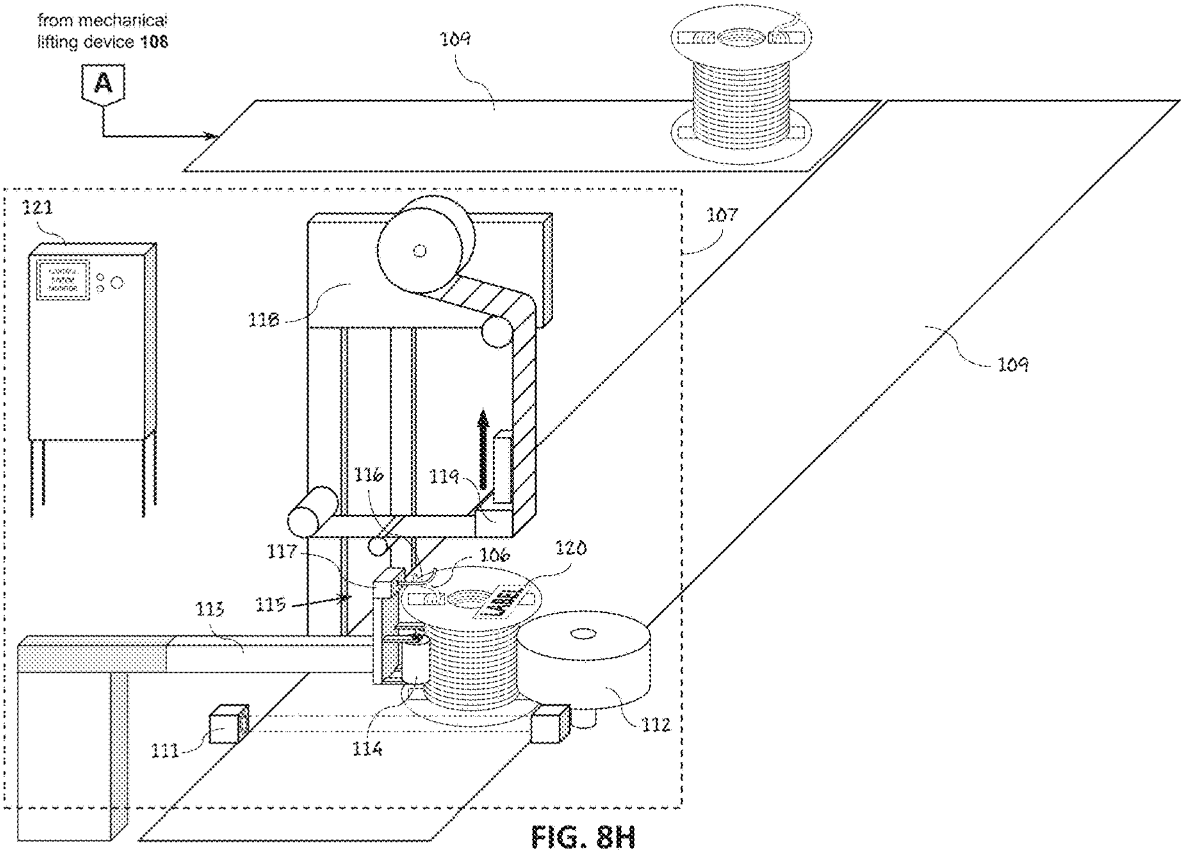
Figure 8I:
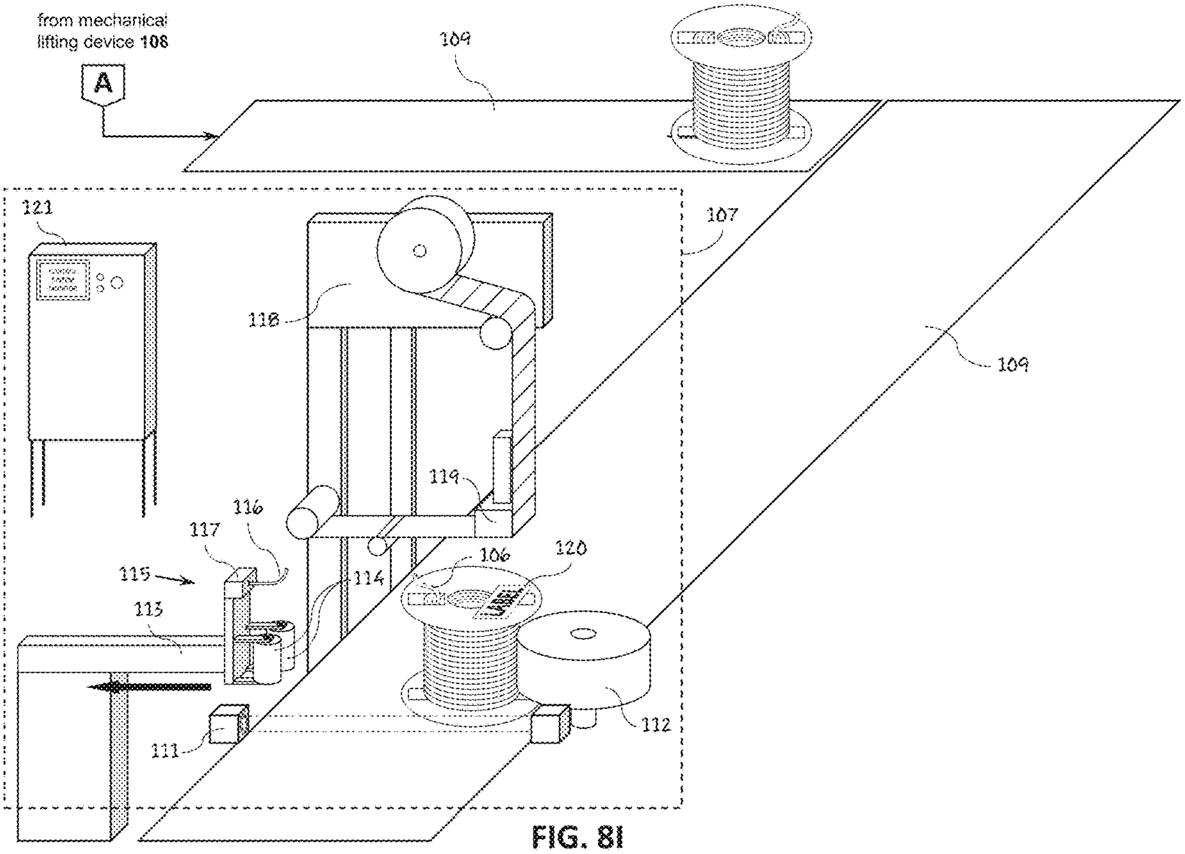
Figure 8J:
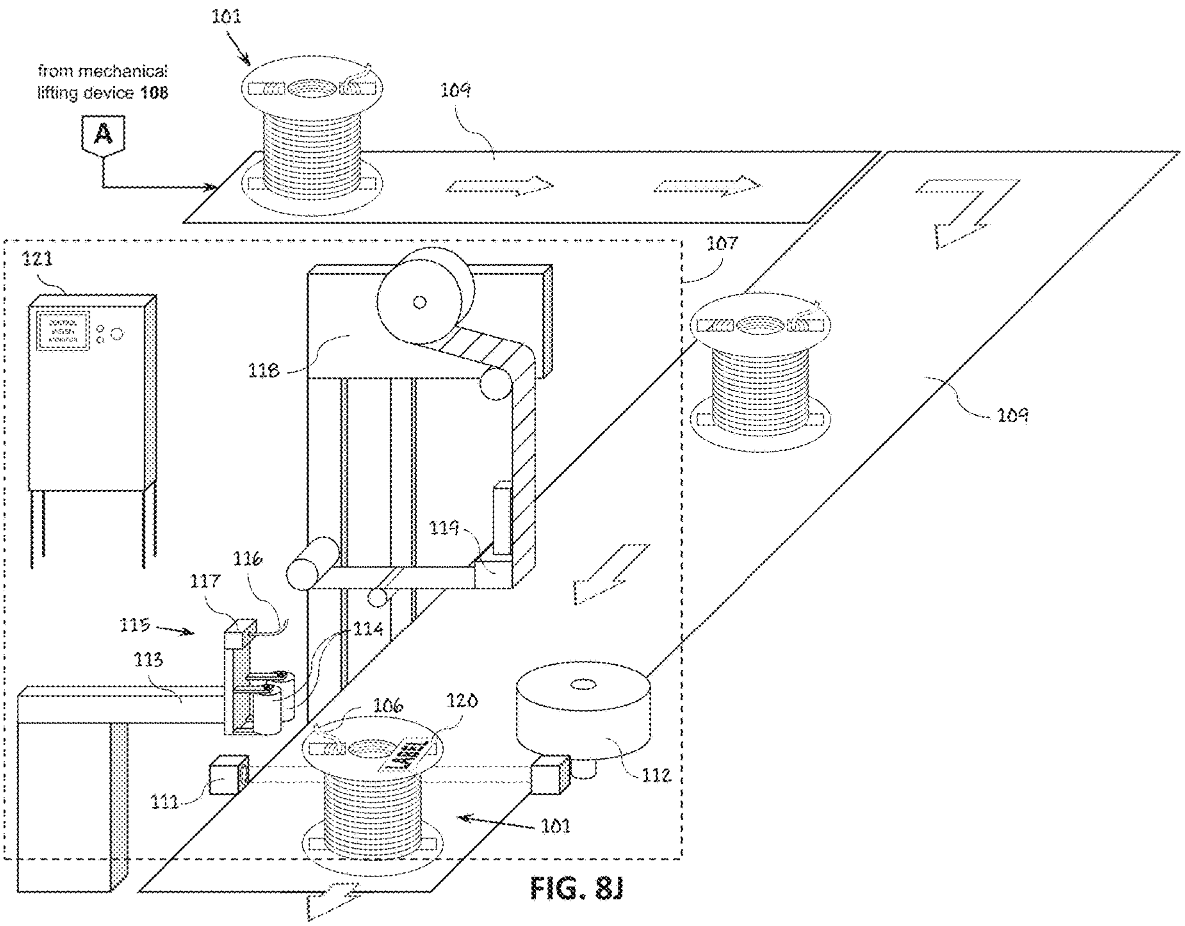
Figure 9:
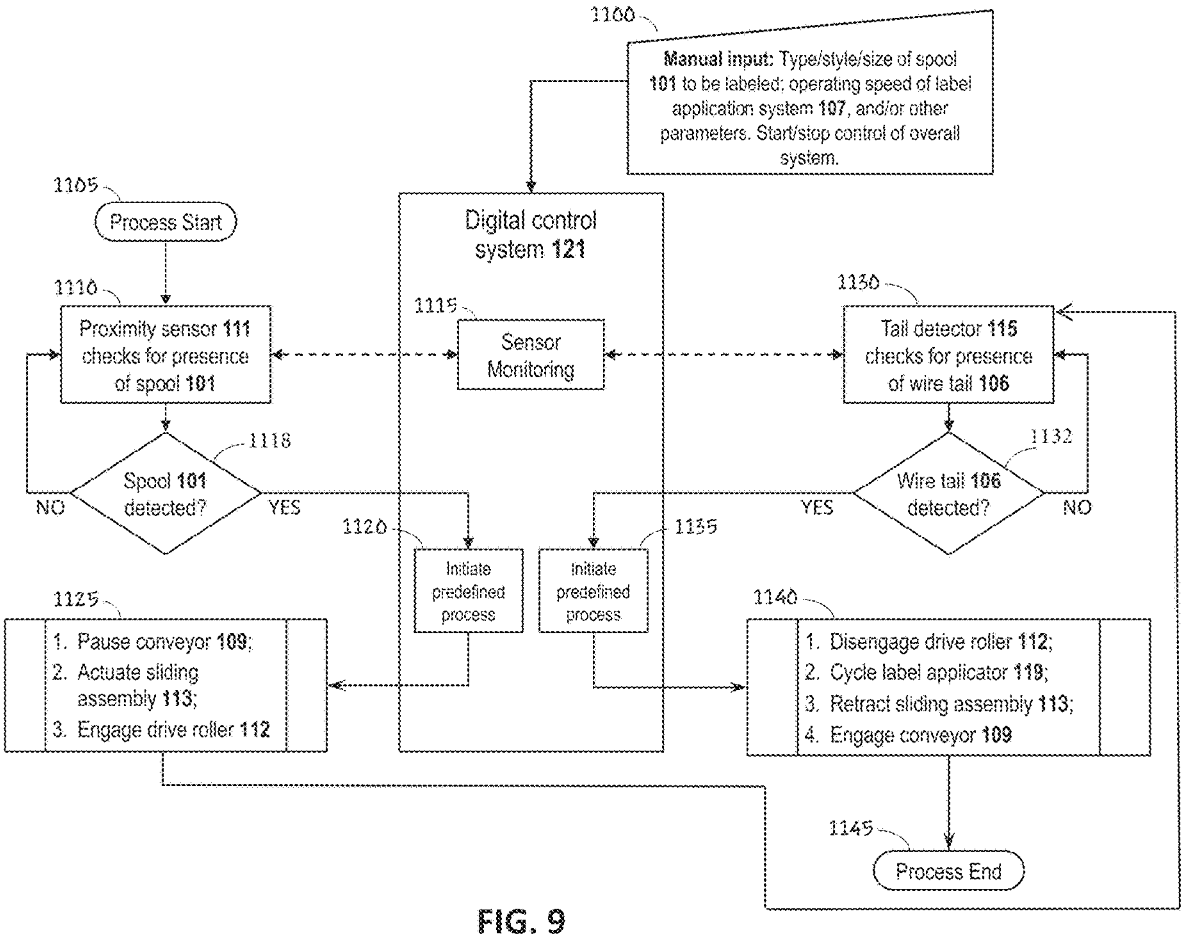

FIGS. 1A-1B are perspective views of a first empty spool according to the prior art; FIG. 1A depicts the empty spool in a vertical (upright) orientation while FIG. 1B depicts the empty spool in a horizontal (flat) orientation;

FIGS. 1C-1D are perspective views of a second empty spool according to the prior art; FIG. 1C depicts the spool in a vertical (upright) orientation while FIG. 1D depicts the empty spool in a horizontal (flat) orientation FIGS. 2A-2B are perspective views of a spool loaded with a wire or cable; FIG. 2A depicts the loaded spool in a vertical (upright) orientation; FIG. 2B depicts the loaded spool in a horizontal (flat) orientation;

FIGS. 3A-3B are top and side views respectively, of a spool loaded with a wire or cable;

FIG. 4 illustrates a self-adhesive product label of the type commonly applied to spools loaded with wire or cable;

FIGS. 5A-5C are top views of a spool, depicting several possible label placements according on one embodiment of the invention;

FIG. 6 is a workflow of one embodiment of a method for applying a label to a spool or reel;

FIG. 7 is a diagram of a spool transport system according to one embodiment of the invention;

FIGS. 8A-8J are diagrams showing the transport of the loaded spool through a label application apparatus according to one embodiment of the invention; and FIG. 9 is a flowchart diagram of the monitoring and command functions of a digital control system used to manage a label application system according to one embodiment of the invention.

DETAILED DESCRIPTION OF THE INVENTION

The general principles described herein may be applied to embodiments and applications other than those specifically detailed below without departing from the spirit and scope of the present invention. Therefore, the present invention is not intended to be limited to the embodiments expressly shown, but is to be accorded the widest possible scope of invention consistent with the principles and features disclosed herein.

The manufacturing of electrical conductor products involves many production steps. For many products, the final two production steps prior to product packaging are (a) spooling, which is the process of winding the conductor product onto an empty spool or reel; and (b) labeling, in which an adhesive product label is attached to one side of the loaded spool.

FIGS. 1A and 1B disclose a first type of spool 101 often used in the industry for spooling various types of wire and cable 105. The spool 101 shown may be fabricated of molded plastic, however, a wide variety of spool materials may be implemented without detracting from the spirit of the invention, including but not limited to sheet metal, wood, or other suitable material, or a combination thereof.

The spool 101, as shown in FIGS. 1A-1B, includes a cylindrical central shaft or arbor 123, a cylindrical central drum 104, and two circular flanges 102, all of which are axially centered along a central axis 103. In one embodiment, the central shaft or arbor 123 is rigidly affixed to four radial spokes 124, which run the length of the central drum 104 and are, in turn, rigidly affixed to the interior wall thereof, however, a wide variety of radial spokes or connection mechanisms may be implemented without detracting from the spirit of the invention. In one embodiment, the flanges 102 are rigidly attached to the opposite ends of the central drum 104. In another embodiment, the flanges 102 are removably attached to the opposite ends of the central drum 104. The spool 101 may include a number of voids or cutouts 110 in the flanges 102. The cutouts 110 may serve a variety of purposes, including decreasing the overall weight of the spool 101, permitting visual inspection of the amount of wire or cable 105 remaining on the spool, and securely attaching the spool 101 to various items, including tools, holders, or dispensers. The sizes, shapes, quantity, and relative disposition of the cutouts 110 may vary without detracting from the spirit of the invention.

Referring now to FIGS. 1C-1D, a second type of spool 101 is disclosed. The flanges 102 shown in FIGS. 1C-1D are crisscrossed by a molded pattern of ridges, which serve to add rigidity to spool 101. These patterns may reduce the weight of the spool 101 or insignificantly increase the weight. Spool sizes and diameters can vary widely. For any given spool 101, the diameter and length of the central drum 104, and its relative proportion to the diameter of the flanges 102, may vary depending upon the type and linear quantity of the wire or cable 105 wound thereupon. The only specific sizing requirement is that flanges 102 must be of a diameter greater than that of the central drum 104, in order to prevent wire or cable product from sliding off the central drum 104.

Referring now to FIGS. 2A-3B a spool containing an amount of spooled wire or cable 105 is disclosed. The spooled wire or cable 105 is wound around the central drum 104. Either at the beginning or conclusion of the winding of the wire or cable 105, a wire tail 106 is passed through one flange 102. In one embodiment, the spooling process, the process of coiling the wire or cable 105 onto a spool 101, leaves a cut-off length of wire or cable 105 at the inner end of the spooled product. This wire tail 106 protrudes from a hole, void, or cutout 110 in one flange 102 of the spool 101. The length of the wire tail 106 is typically several inches, however, the length may vary without detracting from the spirit of the invention. The size, shape, and location of the wire tail 106 may vary without detracting from the spirit of the invention. Spooling and subsequent handling processes may result in a wire tail 106 that is straight, bent, crimped, and/or folded. The final position and orientation of the wire tail 106 may be such that it overlaps a portion of a void or cutout 110, a flange 102, an edge of the central drum 104, or even the central shaft or arbor 124.

The labeling system according to one embodiment of the present invention, anticipates the variability in size, shape, and location of the wire tail 106. Typical automated labeling systems currently employed in the industry do not identify or locate the wire tail 106 prior to applying a self-adhesive label 120 to the flange 102 on the spool 101. It is common for the label 120 to be applied to the flange 102 in a location that results in the label 120 partially or fully overlying or overlapping the wire tail 106. When the label 120 partially or fully overlies or overlaps the wire tail 106, the wire tail 106 may interfere with the adhesion of the label 120 to the flange 102. Consequently, all or part of the label 120 may detach from the spool 101 during handling and/or when the spool 101 is packaged for shipping.

Partial or complete detachment of the label 120 from the spool 101 may cause a variety of problems. First, an unlabeled product cannot be sold or delivered, so the spool 101 must be relabeled manually, a labor-intensive and costly process. Second, a detached adhesive label 120 may adhere to or foul machinery in the manufacturer's facility, such as the labeling apparatus itself, conveyor systems, or other product-handling machinery downstream. Finally, a detached label 120 may inadvertently adhere to another spool 101 which may contain a completely different type or style of wire or cable 105. A mislabeled spool of electrical wire or cable 105 poses not only a quality-control problem, but also a potential safety hazard upon installation.

Turning now to FIG. 4, a self-adhesive label 120 is disclosed. In one embodiment, the label 120 may contain a wide variety of product identification, safety rating, code compliance, and other information. The label 120 may be rectangular; however, a wide variety of shapes may be implemented without detracting from the spirit of the invention. Typically, the label 120 is not larger than the space available on spool 101.

According to one embodiment of the invention, the label 120 is applied to the spool 101 in a location that avoids any overlap or contact with the wire tail 106. The spool 101 is positioned and indexed so that the location of the wire tail 106 may be determined by the label application system. The label 120 is applied so it is clear of the wire tail 106. FIGS. 5A-5C disclose three exemplary positions for the label 120 on a spool 101, however, a wide variety of positions of the label may be implemented as long as the label 120 does not overlap or attach to the wire tail 106, including the application of label 120 in any location that does not overlie or overlap the wire tail 106.

Referring now to FIG. 6, a process workflow according to one embodiment of the invention is disclosed. Referring now to FIGS. 7-8J, diagrams of the spool transport and label application system according to one embodiment of the present invention are disclosed. The various components of the spool transport, label application system, and a labeling apparatus 107 are depicted in FIGS. 8A-8J. Movements and actions of the spool transport, label application system, and labeling apparatus 107 components are shown and are discussed as the process steps of FIG. 6.

Beginning with step 600, an electrical wire or cable 105 is "spooled," or wound onto an empty spool 101. This spooling process, carried out by spooling machinery 122, is situated upstream of the labeling application system.

In step 610, after loaded with wire or cable 105, the spool 101 is transferred from the upstream spooling machinery 122 to the labeling apparatus 107 via a mechanical lifting device 108 and a conveyor system 109. As shown in FIG. 7, the mechanical lifting device 108 transfers the spool 101 from the spooling machinery 122 onto the conveyor system 109. During the transfer, the mechanical lifting device 108 orients the spool 101 so that its central axis 103 is oriented vertically, the flanges 102 situated at both ends of the spool are oriented horizontally, and the spool rests flat upon one flange 102 with the wire tail 106 protruding upward from the second flange 102. In another disclosed embodiment, the spool may be oriented upon one flange 102 with the wire tail 106 protruding from the flange 102 resting on the conveyor system 109. In another embodiment, the spool 101 may be oriented vertically on the conveyor system 109 by the spooling machinery 122. Following this transfer, in step 615, the conveyor system 109 moves the spool 101 downstream to the labeling application system 107.

According to one embodiment, two spools 101 approach the labeling application system 107 via conveyor system 109. While conveyor system 109 is in motion, a digital control system 121 monitors a proximity sensor 111. The proximity sensor 111 checks for the presence of a spool 101 in step 620. In one embodiment, the proximity sensor 111 is an optical sensor, however, a wide variety of sensors may be implemented without detracting from the spirit of the invention including, but not limited to, a mechanical sensor. When a spool 101 is detected, in step 623, the proximity sensor 111 alerts the digital control system 121. Next, in step 625, the conveyor system 109 is stopped in order to keep the spool 101 in the correct position in relation to the label application system 107. When the lateral movement of spool 101 ceases, the control system 121 actuates a pneumatic pusher arm to extend the sliding assembly 113 toward spool 101. The idler rollers 114 contact the spool 101 and push it toward the drive roller 112. The spool is pushed until it is engaged between, and gripped by, the combination of drive roller 112 and idler rollers 114. With spool 101 engaged, the drive roller 112 begins to rotate, spinning the spool in step 630. The rotation of the spool may be in either the clockwise or counterclockwise direction. This rotation of spool 101 facilitates the identification and location of the wire tail 106.

In step 635, wire tail detector 115 checks for the presence of the wire tail 106. The wire tail 106 is identified and located by a wire tail detector 115, which is mounted on the sliding assembly 113 and situated between idler rollers 114. The tail detector 115, according to one embodiment, includes of a thin metal "finger" 116 affixed to a contact switch 117. The contact switch 117 is electrically connected to the digital control system 121, which monitors the status of the contact switch 117. The metal finger 116 is located directly opposite the drive roller 112, at a height above the top surface of the uppermost flange 102. In one embodiment, the vertical clearance between the metal finger 116 and the upper flange 102 of the spool 101 is relatively small so that the clearance is enough to avoid contact between the metal finger 116 and the flange 102 as the spool 101 rotates, but small enough that any object protruding above the surface of the flange 102 will contact the wire finger 116, activating the contact switch 117.

When the spool 101 is oriented such that the wire tail 106 protrudes above the top surface of the upper flange 102, the rotation of the spool 101 must bring the wire tail 106 into contact with the metal finger 116 at some point during a revolution. This contact, when it occurs, triggers the contact switch 117 to signal the digital control system 121 that the wire tail 106 has been identified and located in step 638. In one embodiment, the digital control system 121 will monitor the number of revolutions of the spool 101 or will measure the amount of time the spool 101 has been spinning. If a predetermined number of revolutions has been met or a predetermined time has expired, the digital control system 121 determines that there is no wire tail 106. This may occur when the tail is too short or too thin and it may occur when the wire tail 106 is protruding from the flange 102 that is in contact with the conveyor system 109. When the digital control system 121 makes this determination, the system proceeds as if the wire tail 106 has been detected.

In response to any "tail detection event," the digital control system 121 halts the rotation of drive roller 112 and spool 101 in step 640. In one embodiment, the halting of the rotation of the spool 101 is immediate. In another embodiment, the halting of the rotation of the spool 101 occurs before the spool 101 is rotated another 90 degrees. A wide variety of rotational limits may be implemented without detracting from the spirit of the invention. The spool 101 is held securely in the indexed position such that the wire tail 106 is situated directly across from drive roller 112.

Next, the control system 121 cycles the label applicator or apparatus 119 in step 645. The label applicator 119, in one embodiment, is a pneumatically actuated presser foot, extending downward toward the spool 101 with sufficient force to apply a single self-adhesive label 120 to the top surface of the upper flange 102. In one embodiment, preprinted labels are loaded into a label dispenser 118 as a continuous roll, however a wide variety of label systems may be implemented without detracting from the spirit of the invention. The label dispenser 118 feeds a roll of labels 120 to the label applicator 119. While a pneumatically actuated presser foot label applicator is disclosed, a wide variety of label applicators may be implemented without detracting from the spirit of the invention.

The label applicator 119 is situated near the drive roller 112 and opposite the wire tail detector 115. In one embodiment, the label 120 is affixed to the top surface of the upper flange 102 as distant from the wire tail as practicable, with the outermost edge of the label 120 near the perimeter of the flange 102. Following the application of label 120 to the spool 101, the label applicator 119 retracts upward. Next, the label dispenser 118 advances the label feed, bringing a fresh label into position on the label applicator 119 and completing the label application cycle.

In step 650, the sliding assembly 113 disengages from the spool 101 by retracting away from the drive roller 112 and the spool 101. With the now-labeled spool 101 disengaged, the conveyor system 109 restarts, moving the spool 101 downstream, away from the label application system 107 in step 655. As the newly labeled spool 101 exits the label application system 107, the conveyor system 109 delivers another unlabeled spool 101. The process ends in step 660.

In another embodiment, the label application system 107 may function with a mechanical control system rather than an electric or digital control system 121. A mechanical control system uses levers and switches to control the label applicator 119, the conveyor 109, the wire tail detector 115, and the spool gripper system. The location, rotation, and release of the spool 101 may be controlled with these mechanical systems.

Referring to FIG. 9, the monitoring and command functions of the digital control system 121, according to one embodiment, are disclosed. Step 1100 allows for manual input by a human operator using techniques known in the industry, including the use of a touch-screen, keyboard, or other interface. The operator manually configures and adjusts various settings on the labeling apparatus, including, parameters such as type, style, the size of spool 101 to be labeled, and the labels 120 to be applied. The control system 121 also allows the operator to adjust the operating speed and other parameters of the labeling apparatus 107, monitor the status of the various components thereof, and execute master Stop/Start commands for the overall labeling process as appropriate. In another embodiment, the settings are predetermined and input or accessed automatically into the digital control system 121.

The process begins at step 1105. The default operational state for the conveyor system 109 is moving, so the proximity sensor 111 continuously checks for the presence of a spool 101 in step 1110. The monitoring of all sensors, including the proximity sensor 111, by the control system 121 is shown in step 1115. When a spool 101 is detected in step 1118, the control system 121, in step 1120, triggers a three-part, predefined process. That process, described in step 1125, includes pausing the movement of the conveyor system 109, actuating a pneumatic arm to extend the sliding assembly 113 outward to engage and grip the spool 101, and engaging the drive roller 112 to rotate the spool in order to index the spool and locate the wire tail 106.

As the drive roller 112 and spool 101 rotate, the tail detector 115 continuously checks for the presence of the wire tail 106 in step 1130. As it does with the proximity sensor 111, the control system 121 monitors the tail detector 115 for any change in step 1115. Rotation of the drive roller 112 and the spool 101 continues until the wire tail 106 makes contact with the tail detector and the contact is reported to the control system 121 in step 1132. In another embodiment, the predetermined number of revolutions or predetermined revolution time is met and reported to the digital control system 121. The signal is indicates a "tail detection event." Upon a tail detection event, the control system 121, in step 1135, triggers a four-part, predefined process in step 1140. First, the digital control system 121 disengages the drive roller 112, halting rotation of spool 101. Next, the label applicator 119, affixes a preprinted self-adhesive label 120 to the spool and then the sliding assembly 113 disengages the spool 101 from drive roller 112 and idler rollers 114. Finally, the conveyor system 109 transfers the labeled spool 101 out of and away from the label application system 107, while simultaneously delivering the next unlabeled spool 101 to the label application system 107. The process ends in step 1145.

Although the invention is described herein with reference to specific embodiments, various modifications and changes can be made without departing from the scope of the invention as set forth in the claims below. Accordingly, the specification and figures are to be regarded in an illustrative rather than a restrictive sense, and all such modifications are intended to be included within the scope of the invention. Any benefits, advantages, or solutions to problems that are described herein with regard to specific embodiments are not intended to be construed as a critical, required, or essential feature or element of any or all the claims.

From time-to-time, the invention is described herein in terms of these example embodiments. Description in terms of these embodiments is provided to allow the various features and embodiments of the invention to be portrayed in the context of an exemplary application. After reading this description, it will become apparent to one of ordinary skill in the art how the invention can be implemented in different and alternative environments. Unless defined otherwise, all technical and scientific terms used herein have the same meaning as is commonly understood by one of ordinary skill in the art to which this invention belongs.

The preceding discussion is presented to enable a person skilled in the art to make and use the invention. The general principles described herein may be applied to embodiments and applications other than those detailed below without departing from the spirit and scope of the invention as defined by the appended claims. The invention is not intended to be limited to the embodiments shown, but is to be accorded the widest scope consistent with the principles and features disclosed herein.

In addition, while a particular feature of the invention may have been disclosed with respect to only one of several embodiments, such feature may be combined with one or more other features of the other embodiments as may be desired. It is therefore, contemplated that the claims will cover any such modifications or embodiments that fall within the true scope of the invention.

The various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one", "one or more" or the like; and adjectives such as "conventional", "traditional", "normal", "standard", "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more", "at least", "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

Unless stated otherwise, terms such as "first" and "second" are used to arbitrarily distinguish between the elements such terms describe. Thus, these terms are not necessarily intended to indicate temporal or other prioritization of such elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

All publications and patents mentioned in the above specification are herein incorporated by reference. Various modifications and variations of the described method and system of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the field or any related fields are intended to be within the scope of the following claims.

What is claimed is:

1. A system for applying a label to a spool or reel containing wire and a wire tail extending from the spool, the system comprising:

a spool or reel, wherein the spool or reel comprises a central hub connected to a first flange and a second flange;

wire wound around the central hub;

a wire tail formed by the wire, wherein the wire tail passes through the first flange;

a wire tail sensor; and a label application system, wherein an applied label does not contact the wire tail.

2. The system of claim 1, wherein the label application system further comprising a gripping mechanism.

3. The system of claim 2, wherein the gripping mechanism rotates the spool or reel.

4. The system of claim 3, wherein the gripping mechanism comprises a roller.

5. The system of claim 3 further comprising a sliding assembly coupled to the gripping mechanism.

6. The system of claim 1, wherein the wire tail sensor detects the wire tail location on the spool or reel.

7. The system of claim 1, wherein the label application system further comprising a control system, wherein the control system manages the automated functions of the label application system.

8. The system of claim 7, wherein the control system manages the manual input of operational parameters from a human operator, manages the wire tail sensor input from the wire tail sensor, and controls the operation and function of the label application system.

9. The system of claim 1 further comprising a conveyor system, wherein the conveyor system transports the spool or reel.

10. The system of claim 9, wherein the conveyor system comprises a belt-type conveyor.

11. The system of claim 9, wherein the conveyor system comprises a roller conveyor.

12. The system of claim 1, wherein the label application system comprises a pneumatically actuated presser foot to affix the label to the spool or reel.

13. The system of claim 1, wherein the spool or reel is fabricated from plastic.

14. The system of claim 1, wherein the central hub is rigidly connected to a first flange and a second flange.

15. The system of claim 1, wherein the central hub is removably connected to the first flange and the second flange.

16. The system of claim 1, wherein the spool or reel further comprising at least one void in the first flange.

17. The system of claim 16, wherein the spool or reel further comprising at least one void in the first and second flanges.

18. The system of claim 16, wherein the wire tail protrudes through the at least one void in the first flange.

19. The system of claim 1, wherein the first and second flanges further comprising molded patterns of ridges.

20. The system of claim 1, wherein the wire tail is formed from the inner end of the spooled wire.

* * * * *